# (12) United States Patent
Feldmann et al.

(10) Patent No.: US 7,553,462 B2
(45) Date of Patent: Jun. 30, 2009

(54) METHOD FOR THE PRODUCTION OF MG (OH)₂ NANOPARTICLES

(75) Inventors: Claus Feldmann, Ettlingen (DE); Sascha Ahlert, Dortmund (DE); Jörg-Heino Sachse, Kassel (DE); Ingo Stahl, Vellmar (DE)

(73) Assignee: K&S Aktiengesellschaft, Kassel (DE)

( * ) Notice: Subject to any disclaimer, the term of this patent is extended or adjusted under 35 U.S.C. 154(b) by 225 days.

(21) Appl. No.: 11/820,182

(22) Filed: Jun. 18, 2007

(65) Prior Publication Data

US 2008/0181844 A1    Jul. 31, 2008

(30) Foreign Application Priority Data

Jun. 17, 2006    (DE) ..................... 10 2006 027 915

(51) Int. Cl.
*B01J 21/10* (2006.01)
*C01F 5/02* (2006.01)
*C01F 5/08* (2006.01)
*C01F 5/14* (2006.01)
*C01F 5/20* (2006.01)
*C01F 5/22* (2006.01)

(52) U.S. Cl. ...................... 423/164; 423/158; 423/635; 423/636; 423/639; 423/647; 502/340; 977/811

(58) Field of Classification Search .................. 423/158, 423/164, 635, 636, 639, 647; 502/340; 977/811
See application file for complete search history.

(56) References Cited

U.S. PATENT DOCUMENTS

2006/0133987 A1    6/2006    Ibarra et al.

FOREIGN PATENT DOCUMENTS

DE    101 09 892 A1    9/2002
DE    102 54 567 A1    6/2004

OTHER PUBLICATIONS

Feldmann et al., Polyol-Mediated Preparation of Nanoscale Oxide Particles, 2001, Angewandte Chemie International Edition, vol. 40 No. 2, 359-362.*

* cited by examiner

*Primary Examiner*—Timothy C Vanoy
*Assistant Examiner*—Serena L Hanor
(74) *Attorney, Agent, or Firm*—Collard & Roe, P.C.

(57) ABSTRACT

A method for the production of $Mg(OH)_2$ nanoparticles, by means of polyol-mediated synthesis, from an Mg precursor as well as a base. The particles produced with this method have a diameter between 10 nm to 300 nm, have a mono-disperse particle distribution, and are present in non-agglomerated form. They can be converted to MgO particles by means of calcination.

21 Claims, No Drawings

METHOD FOR THE PRODUCTION OF MG(OH)₂ NANOPARTICLES

BACKGROUND OF THE INVENTION

This application claims priority under 35 USC 119 to German Patent Application No. 10 2006 027 915.8 filed on Jun. 17 2006, the contents of which are herein incorporated by reference.

1. Field of the Invention

The method relates to the production of $Mg(OH)_2$ nanoparticles, in other words particles having a diameter $\leq 100$ nm. These $Mg(OH)_2$ nanoparticles can be converted into MgO nanoparticles by means of calcination.

2. The Prior Art $Mg(OH)_2$ nanoparticles and MgO nanoparticles are finding increasing importance in technical applications, such as, for example, as a catalyst material, in the modification or finishing of material surfaces, such as, for example for the purpose of surface hardening or UV stabilization. Nano-scale $Mg(OH)_2$ particles and MgO particles are furthermore used in the modification of plastics/polymers in connection with flame protection. Another area of use relates to functionalized electrodes and so-called hopping processes.

Several methods are known for the production of nano-scale particles, and especially of MgO particles and $Mg(OH)_2$ particles, respectively.

A common method represents the wet grinding of MgO or $Mg(OH)_2$. Disadvantages of this method are an inefficient use of energy as well as a broad particle size distribution. Another disadvantage lies in the fact that the synthesized nanoparticles must be stabilized to prevent re-agglomeration, by means of adding an additive.

The synthesis of MgO nanoparticles or $Mg(OH)_2$ nanoparticles has been essentially based on gas phase methods until now. In German Patent No. DE 101 09 892 A1, a pyrolysis method, proceeding from $MgCl_2$, for the production of nano-scale MgO having a monomodal particle size distribution is described. Since gas phase methods have the result of the formation of not fully saturated, i.e. unprotected solid body surfaces, it can fundamentally be assumed that an agglomeration of the MgO particles will occur after their synthesis.

German Patent No. DE 102 54 567 A1 discloses a production method for $ZSO_4$ nanoparticles (Z=Mg, Ca, Sr, or Ba, or binary mixtures of the same) in coordinating solvents such as, for example, ethylene glycol or other polyethylene glycols. The nanoparticles synthesized according to this method have a diameter of 0.5 nm to 50 nm and are characterized by a narrow particle size distribution.

This production method cannot be transferred to the production of $Mg(OH)_2$ nanoparticles or MgO nanoparticles, respectively, because of the high basicity of $Mg(OH)_2$ and MgO, respectively ($[OH^-] > 10^{-4}$ mol l$^{-1}$). Because of the high concentration of hydroxide ions $[OH^-]$, decomposition/polymerization of the polyol component is to be expected, and this prevents a targeted synthesis of nanoparticles.

SUMMARY OF THE INVENTION

It is therefore the task of the present invention to produce $Mg(OH)_2$ nanoparticles and MgO nanoparticles, which have a narrow grain size distribution, at an average particle size diameter $\leq 100$ nm, produced in targeted manner. Furthermore, these particles are supposed to be present in non-agglomerated form and are supposed to be easily re-dispersible in other solvents.

It was found that nano-scale $Mg(OH)_2$ particles can be produced synthetically by means of precipitation out of an aqueous $MgCl_2$, $Mg(NO_3)_2$ or $Mg(CH_3COO)_2$ solution, with a base such as NaOH, for example, at relatively high OH concentrations, in the presence of polyols, without any decomposition of the polyol component occurring.

According to the invention, first two solutions are produced, one of which (Solution 1) consists of the Mg precursor, which is dissolved in the selected polyol, and the other solution (Solution 2) represents a component having an alkaline reaction, which is also dissolved in the selected polyol.

$MgCl_2$ or $Mg(NO_3)_2$ or $Mg(CH_3COO)_2$ or their hydrates or aqueous solutions of these salts can be used as Mg precursors. Preferably, $MgCl_2 \times 6H_2O$ or a 1% to 40% aqueous $MgCl_2$ solution is used.

When using an aqueous Mg precursor, after addition of the polyol, the excess water must be removed from Solution 1 or from the mixture of Solution 1 with Solution 2, by means of a suitable method.

The polyol proportion in Solution 1 is supposed to amount to between 90 wt.-% and 99 wt.-%. The base in Solution 2 serves as the precipitant and is selected from the group of NaOH, KOH, LiOH, or quaternary ammonium hydroxide ($NR_4OH$ with $R = CH_3, C_2H_5, C_3H_7, C_4H_9$) or metal alcoholates. Preferably, NaOH or KOH is used. Particularly preferably, NaOH is used.

Preferably, ethylene glycol, diethylene glycol, glycerin, propane diol, or butane diol is used as the polyol in Solution 1 and Solution 2. However, mixtures of two or more of these polyols can also be used. Particularly preferably, diethylene glycol is used.

The polyol proportion in Solution 2 is supposed to amount to between 60 wt.-% and 90 wt.-%.

After the production of Solutions 1 and 2, as described, these are combined, whereby thorough mixing is supported by strong stirring. In this connection, the mixture ratio of Solutions 1 and 2 lies in the range of 1:1 to 1:1.5.

One-stage or multi-stage heating of the resulting mixtures to a temperature between 30° C. and 300° C. follows. It has been shown that it is advantageous to first initiate the precipitation of the $Mg(OH)_2$ at temperatures from 30° C. to 80° C., and to increase the temperature of the mixture to 50° C. to 300° C. in a further step. In this connection, the temperature should be held over a period of 5 min to 60 min during the initial phase (Step 1). After further heating to the final temperature, this temperature should be held over a period of 10 min to 30 min.

For the second stage of heating, the mixture can also be placed into an autoclave.

By means of the method of procedure as described, a suspension of nano-scale $Mg(OH)_2$ is formed, which is subsequently cooled to ambient temperature. The nano-scale $Mg(OH)_2$ solid is removed by means of a suitable solid/liquid separation method. Centrifugation represents a suitable method. After separation, a damp nano-scale $Mg(OH)_2$ product is obtained. This product can be further purified by means of a one-stage or multi-stage process, and adhering polyol can be removed. This generally takes place by means of re-suspension of the damp product in polar solvents such as water, ethanol, isopropanol, or acetone, or a mixture of two or more of these solvents, and subsequent centrifugation.

However, the polyol can also be evaporated by means of heating in air. According to the invention, the surface of the nanoparticles remains covered with the polyol being used, in each instance, even after heating, as long as drying takes place at temperatures less than 250° C. Preferably, drying takes place at temperatures of 40° C. to 100° C., particularly preferably at 50° C. to 80° C.

Nano-scale $Mg(OH)_2$ particles can be produced according to the method described above, and after calcination, these can be converted into MgO nanoparticles. Calcination is carried out at temperatures between 250° C. and 500° C., particularly preferably at 270° C. to 350° C.

The $Mg(OH)_2$ particles and/or MgO particles produced according to the method according to the invention are present in amorphous or crystalline form, and are characterized by the following properties:

- The particle diameters lie in the range of 10 nm to 300 nm, particularly preferably 20 nm to 150 nm, at a monodisperse particle size distribution, whose deviation from the average value amounts to <±20%, particularly preferably <±5%.
- The particle diameters of the nanoparticles produced according to the method according to the invention can be influenced by means of varying the temperature after the addition of Solution 2 to Solution 1. In this connection, the formation of smaller particles is promoted by a lower temperature. Promoting the formation of smaller particles is also possible, in a further embodiment of the method according to the invention, in that the mixture ratio of Solution 1/Solution 2 is varied so that a smaller proportion of Solution 2 leads to the formation of smaller particles.
- The particles possess a spherical habitus and are present in non-agglomerated form, whereby the particle surface is covered by the polyol used, in each instance.
- The nano-scale $Mg(OH)_2$ or MgO according to the invention can be used both as a dry powder and in the form of a suspension with 0.1 wt.-% to 50 wt.-% solid component in a multivalent alcohol, for example glycol, diethylene glycol, glycerin, propane diol, or butane diol. Suspensions having a solid component of 1 wt.-% to 20 wt.-% are particularly preferred.

DETAILED DESCRIPTION OF THE PREFERRED EMBODIMENT

The method will be explained in greater detail below, using exemplary embodiments.

Exemplary Embodiment 1

Under nitrogen, 0.50 g $MgCl_2 \times 6H_2O$ are dissolved in 25 ml diethylene glycol (Solution 1). 1.50 g NaOH are dissolved in 3 ml water, and subsequently, 25 ml diethylene glycol are added (Solution 2). Solution 2 is heated to 50° C., and Solution 2 is added while stirring strongly. The temperature is held at 50° C. for another 30 min. Subsequently, the temperature is increased to 240° C., under distillation conditions, and held for another 10 min. After cooling, a suspension of 0.15 g $Mg(OH)_2$ in 50 ml diethylene glycol is obtained. The suspension is colloidally stable and contains agglomerate-free spherical particles having a diameter of about 100 nm. The suspension can be concentrated to a solid content of up to 0.15 g $Mg(OH)_2$ in 5 ml by means of centrifugation. By means of centrifugation followed by suitable washing processes (for example repeated re-suspension and centrifugation of the particles from ethanol, isopropanol, acetone, or water), the nano-scale solid can be removed. The particle surfaces are covered with diethylene glycol even in the dry powder. Based on this surface modification, easy re-dispersion of the solid in other solvents (for example methanol, ethanol, isopropanol, butanol, butane diol, or water) can take place. Re-dispersion can be supported by means of stirring and/or the effect of ultrasound.

Exemplary Embodiment 2

Under nitrogen, 2.50 g $MgCl_2 \times 6H_2O$ are dissolved in 50 ml diethylene glycol (Solution 1). 7.50 g NaOH are dissolved in 6 ml water, and subsequently, 50 ml diethylene glycol are added (Solution 2). Solution 2 is heated to 50° C., and Solution 1 is added while stirring strongly. The temperature is held at 50° C. for another 30 min. Subsequently, the temperature is increased to 240° C., under distillation conditions, and held for another 10 min. After cooling, a suspension of 0.72 g $Mg(OH)_2$ in 100 ml diethylene glycol is obtained. The suspension is colloidally stable and contains agglomerate-free spherical particles having a diameter of about 100 nm. The suspension can be concentrated to a solid content of up to 0.72 g $Mg(OH)_2$ in 5 ml by means of centrifugation. By means of centrifugation followed by suitable washing processes (for example repeated re-suspension and centrifugation of the particles from ethanol, isopropanol, acetone, or water), the nano-scale solid can be removed. The particle surfaces are covered with diethylene glycol even in the dry powder. Based on this surface modification, easy re-dispersion of the solid in other solvents (for example methanol, ethanol, isopropanol, butanol, or butane diol, water) can take place. Re-dispersion can be supported by means of stirring and/or the effect of ultrasound.

Exemplary Embodiment 3

Under nitrogen, 0.48 g $Mg(NO_3)2 \times 6H_2O$ are dissolved in 25 ml diethylene glycol (Solution 1). 1.50 g NaOH are dissolved in 3 ml water, and subsequently, 25 ml diethylene glycol are added (Solution 2). Solution 2 is heated to 50° C., and Solution 1 is added while stirring strongly. The temperature is held at 50° C. for another 30 min. Subsequently, the temperature is increased to 240° C., under distillation conditions, and held for another 10 min. After cooling, a suspension of 0.15 g $Mg(OH)_2$ in 50 ml diethylene glycol is obtained. The suspension is colloidally stable and contains agglomerate-free spherical particles having a diameter of about 100 nm. The suspension can be concentrated to a solid content of up to 0.15 g $Mg(OH)_2$ in 5 ml by means of centrifugation. By means of centrifugation followed by suitable washing processes (for example repeated re-suspension and centrifugation of the particles from ethanol, isopropanol, acetone, or water), the nano-scale solid can be removed. The particle surfaces are covered with diethylene glycol even in the dry powder. Based on this surface modification, easy re-dispersion of the solid in other solvents (for example methanol, ethanol, isopropanol, butanol, butane diol, or water) can take place. Re-dispersion can be supported by means of stirring and/or the effect of ultrasound.

Exemplary Embodiment 4

Under nitrogen, 0.53 g $Mg(CH_3COO)_2 \times 4H_2O$ are dissolved in 25 ml diethylene glycol (Solution 1). 1.50 g NaOH are dissolved in 3 ml water, and subsequently, 25 ml diethylene glycol are added (Solution 2). Solution 2 is heated to 50° C., and Solution 1 is added while stirring strongly. The temperature is held at 50° C. for another 30 min. Subsequently, the temperature is increased to 240° C., under distillation conditions, and held for another 10 min. After cooling, a suspension of 0.15 g $Mg(OH)_2$ in 50 ml diethylene glycol is obtained. The suspension is colloidally stable and contains agglomerate-free spherical particles having a diameter of about 100 nm. The suspension can be concentrated to a solid content of up to 0.15 g $Mg(OH)_2$ in 5 ml by means of centrifugation. By means of centrifugation followed by suitable washing processes (for example repeated re-suspension and centrifugation of the particles from ethanol, isopropanol, acetone, or water), the nano-scale solid can be removed. The particle surfaces are covered with diethylene glycol even in the dry powder. Based on this surface modification, easy re-dispersion of the solid in other solvents (for example methanol, ethanol, isopropanol, butanol, butane diol, or water) can take place. Re-dispersion can be supported by means of stirring and/or the effect of ultrasound.

Exemplary Embodiment 5

Under nitrogen, 0.55 ml of a 30% aqueous $MgCl_2$ solution are mixed with 25 ml diethylene glycol (Solution 1). 1.50 g NaOH are dissolved in 3 ml water, and subsequently, 25 ml diethylene glycol are added (Solution 2). Solution 2 is heated to 50° C., and Solution 1 is added while stirring strongly. The temperature is held at 50° C. for another 30 min. Subsequently, the temperature is increased to 240° C., under distillation conditions, and held for another 10 min. After cooling, a suspension of 0.15 g $Mg(OH)_2$ in 50 ml diethylene glycol is obtained. The suspension is colloidally stable and contains agglomerate-free spherical particles having a diameter of about 100 nm. The suspension can be concentrated to a solid content of up to 0.15 g $Mg(OH)_2$ in 5 ml by means of centrifugation. By means of centrifugation followed by suitable washing processes (for example repeated re-suspension and centrifugation of the particles from ethanol, isopropanol, acetone, or water), the nano-scale solid can be removed. The particle surfaces are covered with diethylene glycol even in the dry powder. Based on this surface modification, easy re-dispersion of the solid in other solvents (for example methanol, ethanol, isopropanol, butanol, butane diol, or water) can take place. Re-dispersion can be supported by means of stirring and/or the effect of ultrasound.

Exemplary Embodiment 6

Under nitrogen, 0.50 g $MgCl_2 \times 6H_2O$ are dissolved in 25 ml butane diol (Solution 1). 1.50 g NaOH are dissolved in 3 ml water, and subsequently, 25 ml butane diol are added (Solution 2). Solution 2 is heated to 50° C., and Solution 1 is added while stirring strongly. The temperature is held at 50° C. for another 30 min. Subsequently, the temperature is increased to 220° C., under distillation conditions, and held for another 10 min. After cooling, a suspension of 0.15 g $Mg(OH)_2$ in 50 ml butane diol is obtained. The suspension is colloidally stable and contains agglomerate-free spherical particles having a diameter of about 100 nm. The suspension can be concentrated to a solid content of up to 0.15 g $Mg(OH)_2$ in 5 ml by means of centrifugation. By means of centrifugation followed by suitable washing processes (for example repeated re-suspension and centrifugation of the particles from ethanol, isopropanol, acetone, or water), the nano-scale solid can be removed. The particle surfaces are covered with butane diol even in the dry powder. Based on this surface modification, easy re-dispersion of the solid in other solvents (for example methanol, ethanol, isopropanol, butanol, or water) can take place. Re-dispersion can be supported by means of stirring and/or the effect of ultrasound.

Exemplary Embodiment 7

Under nitrogen, 0.50 g $MgCl_2 \times 6H_2O$ are dissolved in 25 ml ethylene glycol (Solution 1). 1.50 g NaOH are dissolved in 3 ml water, and subsequently, 25 ml ethylene glycol are added (Solution 2). Solution 2 is heated to 50° C., and Solution 1 is added while stirring strongly. The temperature is held at 50° C. for another 30 min. Subsequently, the temperature is increased to 190° C., under distillation conditions, and held for another 10 min. After cooling, a suspension of 0.15 g $Mg(OH)_2$ in 50 ml ethylene glycol is obtained. The suspension is colloidally stable and contains agglomerate-free spherical particles having a diameter of about 100 nm. The suspension can be concentrated to a solid content of up to 0.15 g $Mg(OH)_2$ in 5 ml by means of centrifugation. By means of centrifugation followed by suitable washing processes (for example repeated re-suspension and centrifugation of the particles from ethanol, isopropanol, acetone, or water), the nano-scale solid can be removed. The particle surfaces are covered with ethylene glycol even in the dry powder. Based on this surface modification, easy re-dispersion of the solid in other solvents (for example methanol, ethanol, isopropanol, butanol, butane diol, or water) can take place. Re-dispersion can be supported by means of stirring and/or the effect of ultrasound.

Exemplary Embodiment 8

Under nitrogen, 0.50 g $MgCl_2 \times 6H_2O$ are dissolved in 25 ml of a mixture consisting of 50% diethylene glycol and 50% propane diol (Solution 1). 1.50 g NaOH are dissolved in 3 ml water, and subsequently, 25 ml of a mixture consisting of 50% diethylene glycol and 50% propane diol are added (Solution 2). Solution 2 is heated to 50° C., and Solution 1 is added while stirring strongly. The temperature is held at 50° C. for another 30 min. Subsequently, the temperature is increased to 200° C., under distillation conditions, and held for another 10 min. After cooling, a suspension of 0.15 g $Mg(OH)_2$ in 50 ml diethylene glycol/propane diol mixture is obtained. The suspension is colloidally stable and contains agglomerate-free spherical particles having a diameter of about 100 nm. The suspension can be concentrated to a solid content of up to 0.15 g $Mg(OH)_2$ in 5 ml by means of centrifugation. By means of centrifugation followed by suitable washing processes (for example repeated re-suspension and centrifugation of the particles from ethanol, isopropanol, acetone, or water), the nano-scale solid can be removed. The particle surfaces are covered with diethylene glycol or propane diol, respectively, even in the dry powder. Based on this surface modification, easy re-dispersion of the solid in other solvents (for example methanol, ethanol, isopropanol, butanol, butane diol, or water) can take place. Re-dispersion can be supported by means of stirring and/or the effect of ultrasound.

Exemplary Embodiment 9

Under nitrogen, 0.50 g $MgCl_2 \times 6H_2O$ are dissolved in 25 ml diethylene glycol (Solution 1). 2.1 g KOH are dissolved in 3 ml water, and subsequently, 25 ml diethylene glycol are added (Solution 2). Solution 2 is heated to 50° C., and Solution 1 is added while stirring strongly. The temperature is held at 50° C. for another 30 min. Subsequently, the temperature is increased to 240° C., under distillation conditions, and held for another 10 min. After cooling, a suspension of 0.15 g $Mg(OH)_2$ in 50 ml diethylene glycol is obtained. The suspension is colloidally stable and contains agglomerate-free spherical particles having a diameter of about 100 nm. The suspension can be concentrated to a solid content of up to 0.15 g Mg $(OH)_2$ in 5 ml by means of centrifugation. By means of centrifugation followed by suitable washing processes (for example repeated re-suspension and centrifugation of the particles from ethanol, isopropanol, acetone, or water), the nano-scale solid can be removed. The particle surfaces are covered with diethylene glycol even in the dry powder. Based on this surface modification, easy re-dispersion of the solid in other solvents (for example methanol, ethanol, isopropanol, butanol, butane diol, or water) can take place. Re-dispersion can be supported by means of stirring and/or the effect of ultrasound.

Exemplary Embodiment 10

Under nitrogen, 0.50 g $MgCl_2 \times 6H_2O$ are dissolved in 30 ml diethylene glycol and heated to 80° C. (Solution 1). 0.25 g NaOH are dissolved in 5 ml water, and added to Solution 1 while stirring strongly. The temperature is held at 80° C. for another 10 min. After cooling, a suspension of 0.15 g $Mg(OH)_2$ in 30 ml diethylene glycol is obtained. The suspension is colloidally stable and contains agglomerate-free spherical particles having a diameter of about 20 nm. The suspension can be concentrated to a solid content of up to 0.15 g $Mg(OH)_2$ in 5 ml by means of centrifugation. By means of centrifugation followed by suitable washing processes (for example repeated re-suspension and centrifugation of the particles from ethanol, isopropanol, acetone, or water), the nano-scale solid can be removed. The particle surfaces are covered with diethylene glycol even in the dry powder. Based on this surface modification, easy re-dispersion of the solid in other solvents (for example methanol, ethanol, isopropanol, butanol, butane diol, or water) can take place. Re-dispersion can be supported by means of stirring and/or the effect of ultrasound.

Exemplary Embodiment 11

Under nitrogen, 0.50 g $MgCl_2 \times 6H_2O$ are dissolved in 25 ml diethylene glycol (Solution 1). 1.50 g NaOH are dissolved in 3 ml water, and subsequently, 25 ml diethylene glycol are added (Solution 2). Solution 2 is heated to 50° C., and Solution 1 is added while stirring strongly. The temperature is held at 50° C. for another 30 min. Subsequently, the mixture is heated in an autoclave, to 300° C., and held at this temperature for 10 min. After cooling, a suspension of 0.15 g $Mg(OH)_2$ in 50 ml diethylene glycol is obtained. The suspension is colloidally stable and contains agglomerate-free spherical particles having a diameter of about 100 nm. The suspension can be concentrated to a solid content of up to 0.15 g $Mg(OH)_2$ in 5 ml by means of centrifugation. By means of centrifugation followed by suitable washing processes (for example repeated re-suspension and centrifugation of the particles from ethanol, isopropanol, acetone, or water), the nano-scale solid can be removed. The particle surfaces are covered with diethylene glycol even in the dry powder. Based on this surface modification, easy re-dispersion of the solid in other solvents (for example methanol, ethanol, isopropanol, butanol, butane diol, or water) can take place. Re-dispersion can be supported by means of stirring and/or the effect of ultrasound.

Exemplary Embodiment 12

Under nitrogen, 0.50 g $MgCl_2 \times 6H_2O$ are dissolved in 30 ml diethylene glycol and heated to 80° C. (Solution 1). 0.25 g NaOH are dissolved in 5 ml water and added to Solution 1 while stirring strongly. The temperature is held at 80° C. for another 10 min. Subsequently, the mixture is heated in an autoclave, to 300° C., and held at this temperature for 10 min. After cooling, a suspension of 0.15 g $Mg(OH)_2$ in 30 ml diethylene glycol is obtained. The suspension is colloidally stable and contains agglomerate-free spherical particles having a diameter of about 20 nm. The suspension can be concentrated to a solid content of up to 0.15 g $Mg(OH)_2$ in 5 ml by means of centrifugation. By means of centrifugation followed by suitable washing processes (for example repeated re-suspension and centrifugation of the particles from ethanol, isopropanol, acetone, or water), the nano-scale solid can be removed. The particle surfaces are covered with diethylene glycol even in the dry powder. Based on this surface modification, easy re-dispersion of the solid in other solvents (for example methanol, ethanol, isopropanol, butanol, butane diol, or water) can take place. Re-dispersion can be supported by means of stirring and/or the effect of ultrasound.

Accordingly, while only a few embodiments of the present invention have been described, it is obvious that many changes and modifications may be made thereunto without departing from the spirit and scope of the invention.

What is claimed is:

1. A method for the production of $Mg(OH)_2$ nanoparticles, by means of polyol-mediated synthesis, from $MgCl_2$ or $Mg(NO_3)_2$ or $Mg(CH_3COO)_2$ or their hydrates or aqueous solutions of these salts as Mg precursors, and alkali metal hydroxide selected from the group of NaOH, KOH, LiOH or quaternary ammonium hydiboxide ($NR_4OH$ with $R=CR_3$, $C_2H_5$, $C_3H_7$, $C_4H_9$) or metal alcoholates, comprising the following method steps:

dissolving the Mg precursor in a selected polyol, in order to produce a first solution;

producing a second solution in the form of an aqueous alkali metal hydroxide solution mixed with polyol or an aqueous quaternary ammonium hydroxide solution mixed with polyol or metal alcoholates mixed with polyol;

adding the first solution to the second solution to produce a mixture;

stirring the mixture;

heating the mixture in one-stage or many stages to a temperature between 30° C. and 300° C;

cooling a Mg $(OH)_2$ product suspension formed to ambient temperature; and separating solid from the suspension by means of a suitable solid/liquid separation method.

2. A method according to claim 1, wherein $MgCl_2 \cdot 6H_2O$ or a 1% to 40% aqueous $MgCl_2$ solution is used as the Mg precursor.

3. A method according to claim 1, wherein NaOH or KOR is used as the alkali metal hydroxide or $-N(CH_3)_4OH$ is used as the quaternary ammonium hydroxide.

4. A method according to claim 1, wherein ethylene glycol, diethylene glycol, glycerin, propane diol, or butane diol, or a mixture of two or more of these polyols, is used as the polyol.

5. A method according to claim 1, wherein a proportion of polyol in the first solution amounts to between 90 wt.—% and 99 wt.—%.

6. A method according to claim 1, wherein the proportion of polyol in the second solution amounts to between 60 wt.—% and 90 wt.—%.

7. A method according to claim 1, wherein the method uses an aqueous Mg precursor, and wherein excess water is removed after the addition of the polyol.

8. A method according to claim 7, wherein the excess water is removed after mixing with the second solution.

9. A method according to claim 1, wherein the solutions are mixed in a weight ratio of 1:1 to 1:1.5.

10. A method according to claim 1, wherein the step of heating comprises a first step of heating the mixture to a temperature of 30° C. to 80° C., and then a second step of heating the mixture to a temperature of 50° C. to 300° C.

11. A method according to claim 10, wherein after an end temperature of step 1 has been reached, the temperature of the mixture is held over a period of 5 mm to 60 mm, and after an end temperature of step 2 has been reached, the temperature of the mixture is held over a period of 10 mm to 30 mm.

12. A method according to claim 1, wherein the step of heating comprises heating the mixture in an autoclave, to 50° C. to 300° C., over a period of 10 mm to 30 mm.

13. A method according to claim 1, wherein the solid is removed from the suspension by means of centrifugation.

14. A method according to claim 13, wherein the separated solid is washed and subsequently centrifuged by means of a one-stage or multi-stage process, by means of re-suspension in a substance selected from the group consisting of water, ethanol, isopropanol, acetone and a mixture of these substances.

15. A method according to claim 1, wherein the separated solid is dried at temperatures of 40° C. to 100° C.

16. A method according to claim 1, further comprising the step of converting the $Mg(OH)_2$ nanoparticles into MgO nanoparticles by means of calcination at temperatures of 250° C. to 500° C.

17. A method according to claim 1, wherein the $Mg(OH)_2$ nanoparticles or MgO nanoparticles are redispersed in polar solvents such as water or alcohols or mixtures of them.

18. A method according to claim 1, wherein particle diameter is controlled by varying the temperature after the addition of the second solution to the. first solution, wherein a lower temperature promotes the formation of smaller particles.

19. A method according to claim 1, wherein particle diameter is controlled by varying the ratio of the first solution to the second solution, and wherein a lower proportion of the second solution promotes the formation of smaller particles.

20. $Mg(OH)_2$ nanoparticles or MgO nanoparticles produced, by means of polyol-mediated synthesis, from $MgCl_2$ or $Mg(NO_3)_2$ or $Mg(CH_3COO)_2$ or their hydrates or aqueous solutions of these salts as Mg precursors, and alkali metal hydroxide selected from the group of NaOH, KOR, LiOR or quaternary ammonium hydroxide ($NR_4OH$ with R =$CR_3$, $C_2H_5$, $C_3H_7$, $C_4H_9$) or metal alcoholates, comprising the following method steps:

dissolving the Mg precursor in a selected polyol, in order to produce a first solution;

producing a second solution in the form of an aqueous alkali metal hydroxide solution mixed with polyol or an aqueous quaternary ammonium hydroxide solution mixed with polyol or metal alcoholates mixed with polyol;

adding the first solution to the second solution to produce a mixture;

stirring the mixture;

heating the mixture in one-stage or many stages to a temperature between 30° C. and 300° C.;

cooling a $Mg(OH)_2$ product suspension formed to ambient temperature; and separating solid from the suspension by means of a suitable solid/liquid separation method, the nanoparticles having the following characteristics:

a particle surface covered by the polyol used;

a spherical habitus; a non-agglomerated form;

particle diameters lie a range of 10 nm to 300 nm; and a mono-disperse particle size distribution, a deviation from the average of which amounts to >±20%.

21. $Mg(OH)_2$ nanoparticles or MgO nanoparticles according to claim 20 in the form of a suspension having a solid component between 0.1 wt.—% and 50 wt.—%.

* * * * *

UNITED STATES PATENT AND TRADEMARK OFFICE
CERTIFICATE OF CORRECTION

PATENT NO. : 7,553,462 B2  Page 1 of 1
APPLICATION NO. : 11/820182
DATED : June 30, 2009
INVENTOR(S) : Feldmann et al.

It is certified that error appears in the above-identified patent and that said Letters Patent is hereby corrected as shown below:

In particular, in Column 8, line 39, (Line 6 of Claim 1) please change "hydiboxide" to correctly read: --hydroxide--.

In the same line, please change "R=CR$_3$" to correctly read: --R = CH$_3$--.

In Line 1 of Claim 3 please change "KOR" to correctly read: --KOH--.

In Column 10, line 3 (Line 3 of Claim 18), please change "the. first" to correctly read: --the first--.

In Line 5 of Claim 20, please change "KOR, LiOR" to correctly read: --KOH, LiOH--.

In Line 6 of Claim 20, please change "R =CR$_3$" to correctly read: --R = CH$_3$--.

In Line 31 of Claim 20, please change "> ±20%" to correctly read: --< ± 20%--.

Signed and Sealed this

Twenty-fifth Day of August, 2009

David J. Kappos
*Director of the United States Patent and Trademark Office*